United States Patent
Sridhar et al.

(10) Patent No.: US 8,218,433 B2
(45) Date of Patent: Jul. 10, 2012

(54) MONITORING CONNECTIVITY IN RING NETWORKS

(75) Inventors: Kamakshi Sridhar, Plano, TX (US); Atiya Suhail, Plano, TX (US); David Elie-Dit-Cosaque, Allen, TX (US)

(73) Assignee: Alcatel Lucent, Paris (FR)

(*) Notice: Subject to any disclaimer, the term of this patent is extended or adjusted under 35 U.S.C. 154(b) by 698 days.

(21) Appl. No.: 12/319,390

(22) Filed: Jan. 7, 2009

(65) Prior Publication Data

US 2010/0172245 A1 Jul. 8, 2010

(51) Int. Cl.
*G06F 11/00* (2006.01)
*H04L 12/437* (2006.01)
*H04L 12/56* (2006.01)

(52) U.S. Cl. ............. 370/222; 370/236.2; 370/244; 370/401

(58) Field of Classification Search .......... 370/216–252, 370/258, 400–406; 709/213, 226, 237–238, 709/242; 714/1–4.5, 48, 748, 799
See application file for complete search history.

(56) References Cited

U.S. PATENT DOCUMENTS

| | | | |
|---|---|---|---|
| 5,497,460 A * | 3/1996 | Bailey et al. | 714/39 |
| 2007/0140126 A1* | 6/2007 | Osswald et al. | 370/236.2 |
| 2009/0161562 A1* | 6/2009 | Shah et al. | 370/245 |
| 2009/0282291 A1* | 11/2009 | Fitzgerald et al. | 714/39 |
| 2010/0182913 A1* | 7/2010 | Ding et al. | 370/248 |
| 2010/0208580 A1* | 8/2010 | Kikuta et al. | 370/216 |
| 2010/0226244 A1* | 9/2010 | Mizutani et al. | 370/220 |
| 2010/0254258 A1* | 10/2010 | Zheng | 370/222 |
| 2011/0026397 A1* | 2/2011 | Saltsidis et al. | 370/228 |

* cited by examiner

*Primary Examiner* — Tri H Phan
(74) *Attorney, Agent, or Firm* — Stephen Wyse

(57) ABSTRACT

A system, method, and device for monitoring the connectivity of a network that has been configured in a ring topology, such as an Ethernet ring network. The ring network includes a plurality of nodes, each with first port and a second port for forwarding CC messages to respective neighbor nodes, and an MEP for forming and processing the CC messages. Of the plurality of network nodes, neighbor nodes are selected as CC forwarding nodes and, after a database on each node has been configured, the selected nodes begin sending CC messages to each other via the ring network, beginning with transmission to a non-selected node. If a selected node fails to receive an expected CC message, it transmits a fault notification and ceases sending CC messages. The network then reselects CC message forwarding nodes, which begin forwarding CC messages until another fault is detected or the network is otherwise reconfigured.

19 Claims, 9 Drawing Sheets

MONITORING CONNECTIVITY IN RING NETWORKS

FIELD OF THE INVENTION

This invention relates generally to the field of communication networks and, more particularly, to a device, system, and method for monitoring connectivity in Ethernet rings and other ring-topology networks.

BACKGROUND OF THE INVENTION

Communication networks are used for the transmission of information from one network device to another, or to a device in another network, or to some kind of subscriber device, such as a cellular telephone, laptop computer, or PDA (personal digital assistant). Some communication networks are only a part of a larger communication system. For example, an access network may be employed to allow numerous geographically-distributed access nodes to communicate with each other and with a core communication network for the purpose of establishing a communication session between individual subscribers in communication with one of the access nodes and other subscribers reachable via the core network.

Modern communication systems typically use IP (Internet protocol) packet-routing to transmit information. In this scheme, the information to be transmitted, for example voice or data information, is digitized and packaged into relatively-small units called packets or frames. Each frame is then addressed for routing through the network to its final destination. Since individual frames may take different paths through the network, they also include information that allows the transmitted information to be reassembled into its original form.

The networks themselves may be configured and operated in different ways. To enable many different kinds of devices made by various manufacturers to cooperate with each other, certain standards have been promulgated by various standard-setting bodies. An Ethernet network, for example, is one operable according to a standard known as IEEE 802.3 and a number of related standards. These standards, among other things, establish rules for when network devices may transmit information, how the information should be packaged and addressed, and how to resolve any conflicts that arise when devices compete for limited network resources.

When a large number of interconnected network components are available for routing information, it is helpful to organize them in some fashion. While each network node is provided with information that facilitates the routing of frames, there needs to be some way to avoid routing them through too many nodes in an inefficient path to their destination. One way to address this issue is to employ STP (spanning tree protocol), specified in IEEE 802.1D, in one of its various forms. Generally speaking, STP examines the topology, or various data paths available through the network, and dictates that certain available network segments not be used. This is done by logically blocking the port of a particular network component that is on one end of the segment that is to be avoided. No traffic is sent or received on a blocked port until such time as the established paths are reconfigured. This reconfiguration, sometimes referred to as re-convergence, may be necessary, for example, when a particular network component fails or is removed from service, or when a fault occurs in the network segment connecting two components.

Another manner of organizing network nodes is to simply impose a specific topology, such is done in the creation of ring networks. Ring networks are currently employed, for example, as access networks in wireless communication systems. As the name implies, in a ring network, each network component, or node, has a unique pair of neighbor nodes and can communicate with any other node in the ring through either of these two neighbors. Note that this topology may be physically imposed, by connecting each node only with its two neighbors, or logically-created, by allowing nodes otherwise connected in a variety of ways to only communicate with their respective designated neighbors. An exemplary ring network is shown in FIG. 1 and described below.

However organized, it is also desirable to have a way for networks to monitor whether the established organizational structure is still viable. A fault in one segment, for example, might register the extant routing scheme untenable, or at least create greater inefficiency. When the existence of a fault becomes known, changes to the routing schemes can, if possible, be made to allow the efficient routing of network traffic to continue. One way to monitor the status of network connectivity is through the transmission of CC (connectivity check) messages.

CC messages, in the Ethernet context, are specified in IEEE 802.1ag. In typical practice, each of the network nodes sends a CC message to each of the other nodes periodically or at predetermined times. When a node does not receive a CC message as expected, a network fault is presumed. While efficacious, this method does involve the sending, forwarding, receipt, and processing of a great many CC messages. For example, if n is the number of network nodes in a ring network, then n(n−1) messages must be received each CC message cycle. This could, among other things, require the dedication of a large amount of memory simply to store information related to the CC messages.

Needed, therefore, is a more efficient manner of fault protection for ring networks, that is, the monitoring of the connectivity status of networks and making any possible adjustments to the network routing scheme, especially, in the context of the present invention, in ring networks operating according to an Ethernet protocol.

SUMMARY OF THE INVENTION

The present invention provides an efficient manner of monitoring connectivity in a network having a ring topology, for example in an Ethernet network used as an access network in a telecommunication system.

In one aspect, the present invention is a method including selecting from a plurality of nodes configured in a ring topology a pair of neighboring CC (connectivity check) message generating nodes, wherein at least one node of the pair of nodes comprises a port that is down or designated as a blocked or backup port by, for example, STP (spanning tree protocol) or similar protocols, generating CC messages in each of the selected CC message generating nodes, forwarding them to the respective other CC generating node, and determining if a fault in the network has occurred. The method may further include sending a fault notification if a fault is detected, and selecting a second pair of CC message generating nodes for generating and forwarding CC messages. The second pair of CC message generating nodes may or may not include one or both of the originally selected pair. In a preferred embodiment, the network is an Ethernet network and an STP routine is executed to assign blocked or backup ports; ports that are down due to a network fault may be designated as blocked ports.

In another embodiment, there is provided a method for monitoring connectivity in a ring network, such as an Ethernet ring or similar network, including determining which ports within the network are down, or designated as blocked or backup ports following execution of an STP routine, configuring MEP (maintenance end points) associated with each node, selecting two CCM (connectivity check message) forwarding nodes, forwarding CCMs across the ring node, receiving and processing the CC messages in the configured MEPs associated with the selected nodes, and determining whether a fault exists. The method may further include, upon detecting a fault, deselecting the originally selected CCM forwarding nodes and then returning to the step selecting two CCM forwarding nodes. A fault notification may be generated and sent, in some cases broadcast, to alert other network nodes or the network operator that a fault has occurred. In some embodiments, the method further includes forming the ring topology in a communications system.

In still another embodiment, there is provided a network node for use in a ring network such as an Ethernet ring, the node including a first port and a second port for communicating with respective neighbor nodes in the ring network, a network interface for determining whether either the first port or the second port is a down port or designated as a blocked or backup port, an MEP for generating CC messages if either the first port or the second port is determined to be a down port or designated as a blocked or backup port, a controller for controlling at least the network interface and the MEP, and a memory device in communication with the controller. The node also preferably includes a fault notification generator for generator fault notifications in the event a fault is detected.

In still another embodiment, there is provided a communication system plurality of nodes arranged in a ring topology, each node including a first port and a second port for communicating with respective neighbor nodes in the ring network, a network interface for determining whether either the first port or the second port is a down port or designated as a blocked or backup port, an MEP for generating CC messages if either the first port or the second port is determined to be a down port or designated as a blocked or backup port, a controller for controlling at least the network interface and the MEP, and a memory device in communication with the controller. The ring topology may be physically or logically created.

BRIEF DESCRIPTION OF THE DRAWINGS

The foregoing and other advantages of the invention will become apparent upon reading the following detailed description and upon reference to the drawings, in which.

DESCRIPTION OF THE PREFERRED EMBODIMENT(S)

The present invention is directed to a manner of monitoring connectivity in a communication network ring. The invention may be of advantage, for example, in an Ethernet ring access network implemented in a wireless communication system. Embodiments of the network will now be described in reference to FIGS. 1 through 9.

Figure 1:
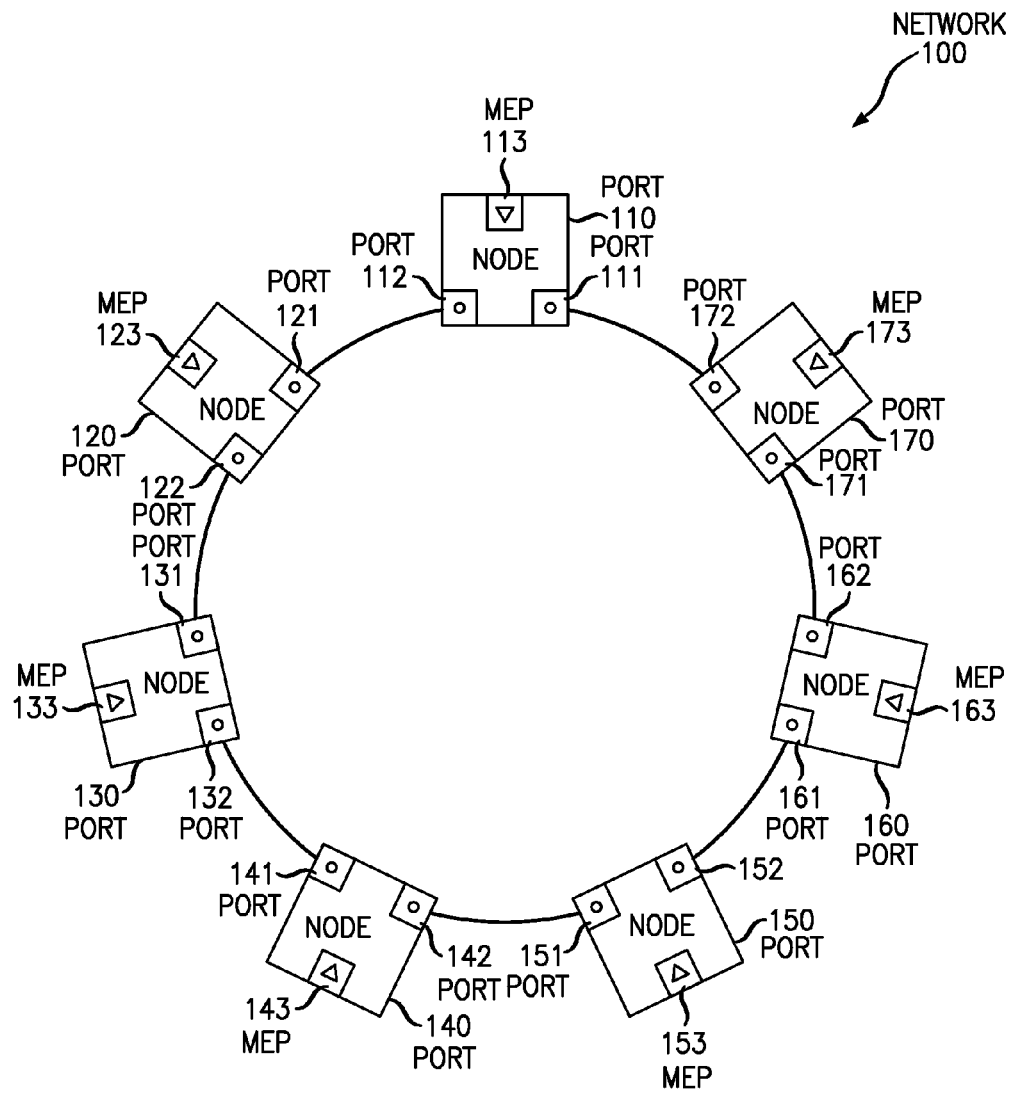
FIG. 1 is a block diagram illustrating a network configured in a ring topology.

FIG. 1 is a block diagram illustrating a network 100 configured in a ring topology, in which an embodiment of the present invention may be advantageously implemented. Ring network 100 of FIG. 1 includes seven nodes, referred to as 110, 120, 130, 140, 150, 160, and 170. It should be noted that although only seven nodes are illustrated in FIG. 1, in an actual implementation there may be many more (or fewer). The nodes may, for example, be access bridges in the access network of a wireless communication system. Other implementations are, of course, possible as well. And while each of the nodes 110 through 170 is illustrated in FIG. 1 to be similar or identical to each of the others, this is not necessarily the case in every implementation.

In the embodiment of FIG. 1, each of the nodes is illustrated as having a first port and a second port. Network node 110, for example, includes first port 111 and second port 112, and network node 120 includes first port 121 and second port 122. In similar fashion, network nodes 130 through 170 each include a first port (numbered 131 through 171) and a second port (numbered 132 through 172). These ports are configurable to send and receive information along the ring network. For example, network node 110 can send frames of information via its first port 111 to, and receive frames of information from, second port 172 of its neighbor node 170. The transmitted information may include voice or data information being transmitted from network node 110 to network node 170, or it may be information being transmitted to another device such as network node 160. In that case, when the information from first port 111 of network node 110 reaches the second port 172 of network node 170, it is simply forwarded from the first port 171 of network node 170 to the second port 162 of network node 160. Information from any node of network 100 may be sent in either direction to any other node in similar fashion.

During the forwarding process, the information transmitted may be held for a time in a memory device (not shown) resident in network node 170, for example when waiting for an opportunity to forward the information to or toward its final destination. The information is generally not processed in any other manner, however, except as necessary to determine its destination and to store it until it can be transmitted. As mentioned above, the information may be voice or data, which has somewhere been generated and packaged into frames for transport, each frame including the address and any other information necessary for delivery to its final destination and reassembly of the conveyed information into its original (or some other desired) format.

For example, when network 100 is used as an access network in a wireless telecommunication system, each access node may receive voice and data traffic from mobile and other devices (not shown). This traffic may be aggregated by a network node for transmission through the network to a core network (also not shown) where it can be routed to its ultimate destination.

Control signals may also be transmitted between neighbor nodes and elsewhere, control signals in this sense being any overhead or administrative information sent between network nodes to relay, for example, information about the status of the network or other information necessary to perform network functions, such as the proper routing of frames. Control signals may be received and forwarded in much the same manner as voice and data frames, and in each node will either be simply forwarded toward their ultimate address or processed in a network node for which they are intended. Control signals and voice and data traffic may also be sent to or received from destinations outside of the network (not shown).

Other information may be routed internally within the ring network 100 itself. For example, as mentioned above, a typically network may have many more nodes than are illustrated in FIG. 1. In addition, the individual nodes and the connections between then may occasionally be removed from or added back to the network as part of a planned or unplanned outage. It is therefore desirable to perform some sort of test to ensure that no faults have occurred in the network structure. IEEE 802.1ag CC (continuity check) messages, mentioned above, may be used for this purpose.

In the ring network of FIG. 1, each node includes a MEP (maintenance end point), with each MEP 113 through 173 resident in respective one of network nodes 110 through 170. In typical operation, each MEP 113 through 173 sends a CC message to each of the other MEPs periodically or at predetermined times. When an MEP does not receive a CC message as expected, a network fault is presumed, and a fault notification is sent. Corrective action, if possible, may then be undertaken. As also mentioned above, however, this manner of fault protection does use a relatively-large amount of network resources.

As will be apparent, the present invention significantly contributes to the conservation of network resources in this regard, by greatly reducing the number of CC messages required for connectivity checking. This will now be explained in greater detail with reference to FIG. 2.

Figure 2:
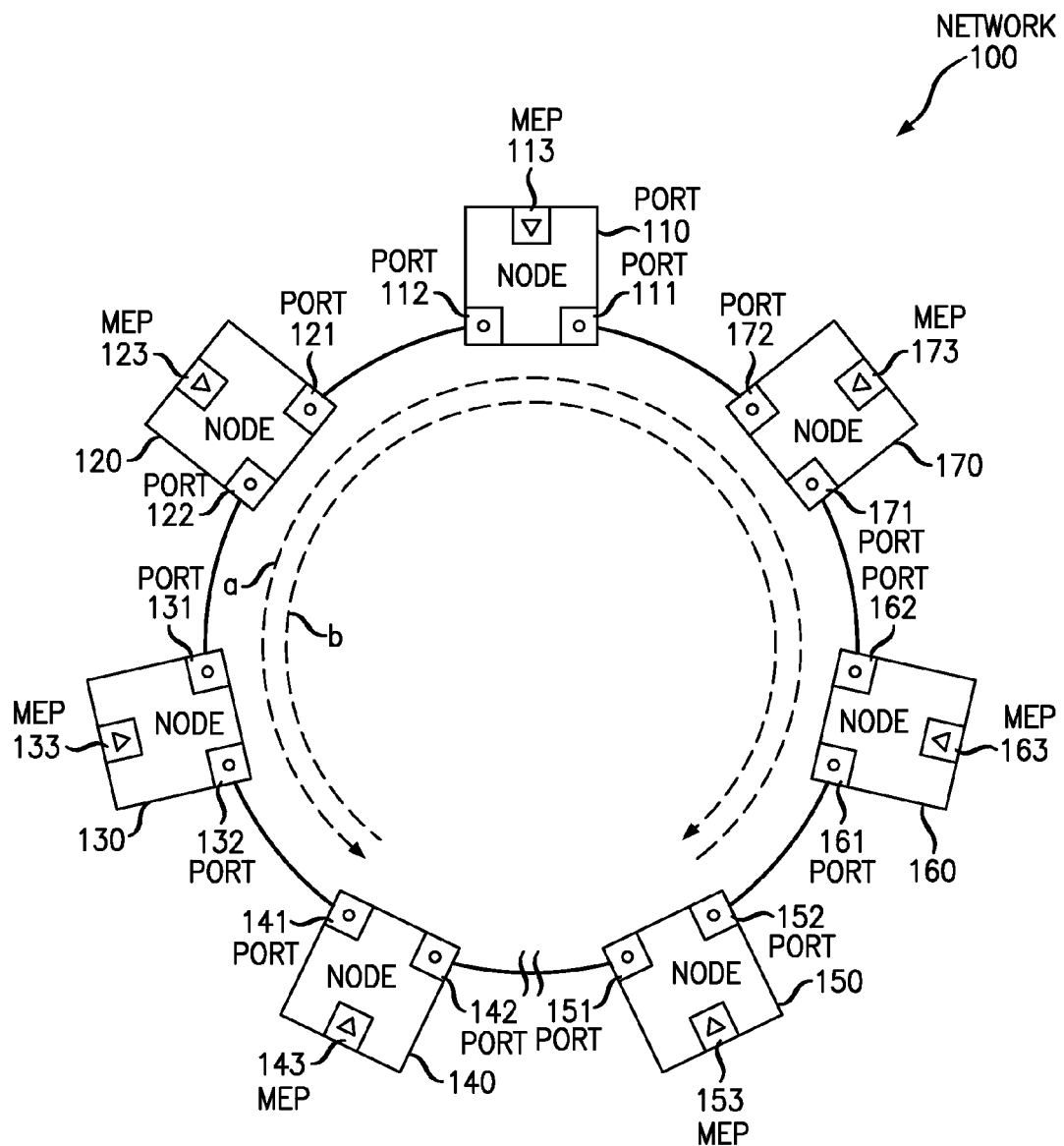
FIG. 2 is a block diagram illustrating the use of CC (connectivity check) messages for connectivity monitoring in the ring network of FIG. 1 according to an embodiment of the present invention.

FIG. 2 is a block diagram illustrating the use of CC messages for connectivity monitoring and fault protection in the ring network 100 of FIG. 1 according to an embodiment of the present invention. In the embodiment of FIG. 2, the segment of ring network 100 between nodes 140 and node 150 is not used for the sending of CC messages, either those originating at one of neighbor nodes 140 or 150 or any CC messages originating elsewhere. The (perhaps temporary) exclusion of this network segment was accomplished, according to this embodiment of the present invention, by executing an STP (spanning tree protocol) routine and permitting port 142 to be blocked. When then occurs, port 151 becomes a backup port. Here, it should be noted that while there are several variations of STP in use, they are herein each considered included in the term "STP" unless a particular variation is incompatible with the present invention or explicitly excluded in describing a particular embodiment.

In accordance with this embodiment of the present invention, once the segment of network 100 between ports 142 and 151 is excluded, CC messages are sent from MEP 143 of node 140 to MEP 153 of node 150 via port 141 and along path a (illustrated by a broken line). At the same time, CC messages are sent out from MEP 153 of node 150 to node 140 via port 152 and along path b (also illustrated by a broken line). CC messages on path a are first received at port 132 of node 130 and, according to the present invention, not processed there but simply forwarded on port 131 along path a to port 122 of node 120. This process continues until the CC message from node 140 is received in port 152 of node 150 and processed by MEP 153.

Correspondingly, CC messages formed by MEP 153 of node 150 are sent out on port 152 and received at port 161 of node 160. These messages are not processed there, but are simply forwarded on port 162 and along path b. Again, this process continues until the CC messages from node 150 are received in port 141 of node 140 and processed by MEP 143. During operation as described above, MEPs 113, 123, 133, 163, and 173 are disabled and do not generate CC messages for forwarding or process those receive at their respective node. This will continue at least until notification of a fault condition is received or some other predetermined condition has been met. The PDBs (permanent databases, not shown in FIG. 1) of nodes 140 and 150 have each been populated with the MAC (media access control) address of the other. So long as MEPs 143 and 153 continue to receive on a non-blocked or backup or down port CC messages from each other, they will assume that network segments (except of course the one directly between them) are functional and that no fault has occurred.

Figure 3:
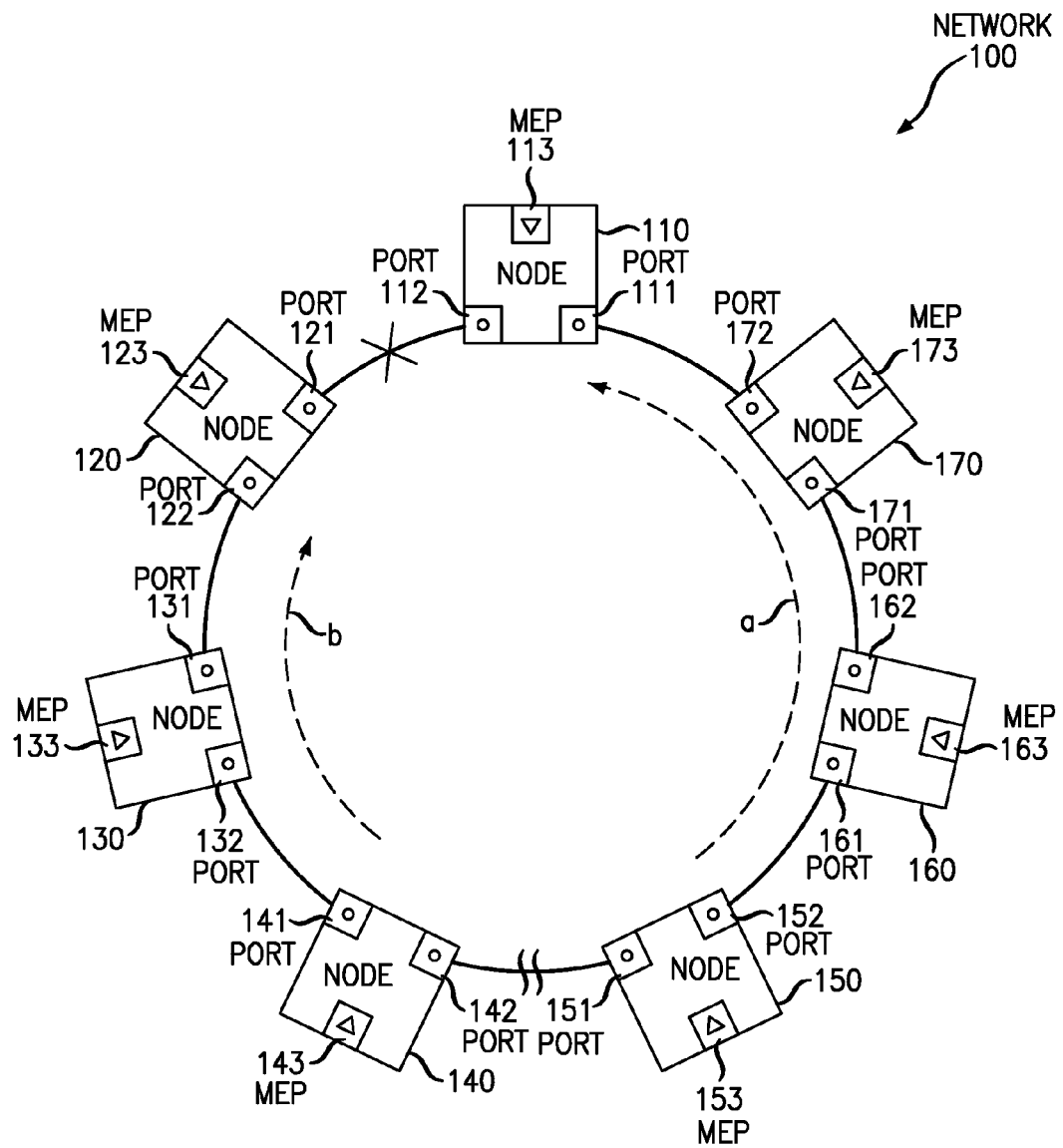
FIG. 3 is a block diagram illustrating the detection of a fault according to an embodiment of the present invention.

FIG. 3 is a block diagram illustrating the detection of a fault in network 100 according to an embodiment of the present invention. As illustrated in FIG. 3, a fault of some type has occurred between node 110 and node 120. As a consequence, CC message path a extends only as far as port 111; although node 110 will attempt to forward received CC messages on port 112, in this it will not be successful. Correspondingly, CC message path b extends only to port 122 on node 120. Neither node 140 nor node 150 will receive any CC messages following the occurrence of the fault condition. In response, each of nodes 140 and 150 will generate and transmit a fault notification. Note that under the circumstances presented in the embodiment of FIG. 3, a network manager connected in-band or out-of-band with the nodes would receive this notification; the network-manager address is configured in each ring node. It is not necessary, of course, that the response followed immediately the non-receipt of a single expected CC message. In some implementations it may be desirable to trigger a fault notification only after a certain number of such messages have not arrived. Naturally, the desire to avoid a premature fault notification will be balanced against the desire for prompt remedial action.

Figure 4:
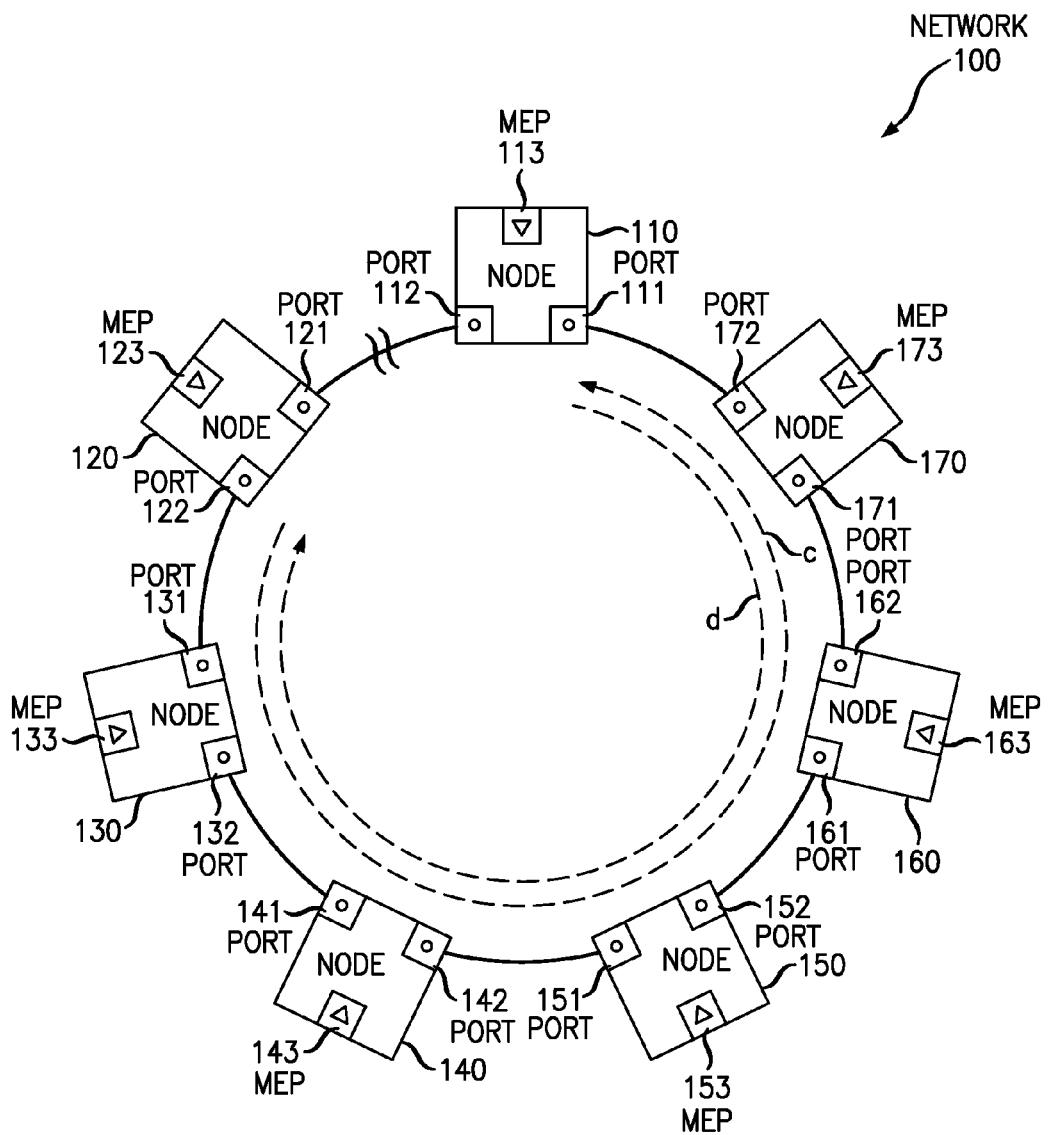
FIG. 4 is a block diagram illustrating a response to detection of the fault illustrated in FIG. 3, according to an embodiment of the present invention.

FIG. 4 is a block diagram illustrating a response to detection of the fault in network 100, illustrated in FIG. 3, according to an embodiment of the present invention. As can be seen in FIG. 3, the network segment extending between the second port 142 of node 140 and the first port 151 of node 150 has been restored to service. Instead, the first port 121 of node 120 has been logically blocked, making port 112 of node 110 a backup port. The segment of network 100 extending between port 112 and port 121 is now excluded from the path for CC messages. To facilitate the new configuration, the relevant entries in the respective PDBs of nodes 140 and 150 are removed, while analogous entries are placed in the PDBs of nodes 110 and 120. Nodes 110 and 120 will now expect to receive CC messages from each other on ports 111 and 122, respectively, that is, on the ports that are not down or designated as blocked or backup ports.

In accordance with this embodiment of the present invention, once the segment of network 100 between ports 112 and 121 is excluded, CC messages are sent from MEP 123 of node 120 to MEP 113 of node 110 via port 122 and along path c. At the same time, CC messages are sent out from node 120 to node 110 via port 122 and along path d. CC messages on path c are first received at port 131 of node 130 and, according to the present invention, not processed there but simply forwarded on port 132 along path c to port 141 of node 140. This process continues until the CC message from node 120 is received in port 111 of node 110 and processed by MEP 113.

Correspondingly, CC messages formed by MEP 113 of node 110 are sent out on port 111 and received at port 172 of node 170. These messages are likewise not processed there, but are simply forwarded on port 171 and along path d. Again, this process continues until the CC messages from node 110 are received in port 122 of node 120 and processed by MEP 123. During operation as described above, MEPs 133 through 173 are disabled and do not form or process received CC messages. As should be apparent, this monitoring scheme is similar to the process illustrated in FIG. 2, except that the excluded segment of network 100 (between ports 112 and 121) coincides with where the fault occurred (as shown in FIG. 3). In a preferred embodiment, this follows from the execution of an STP routine and a determination that either of ports 112 or 121 should be blocked based on current network conditions.

Figure 5:
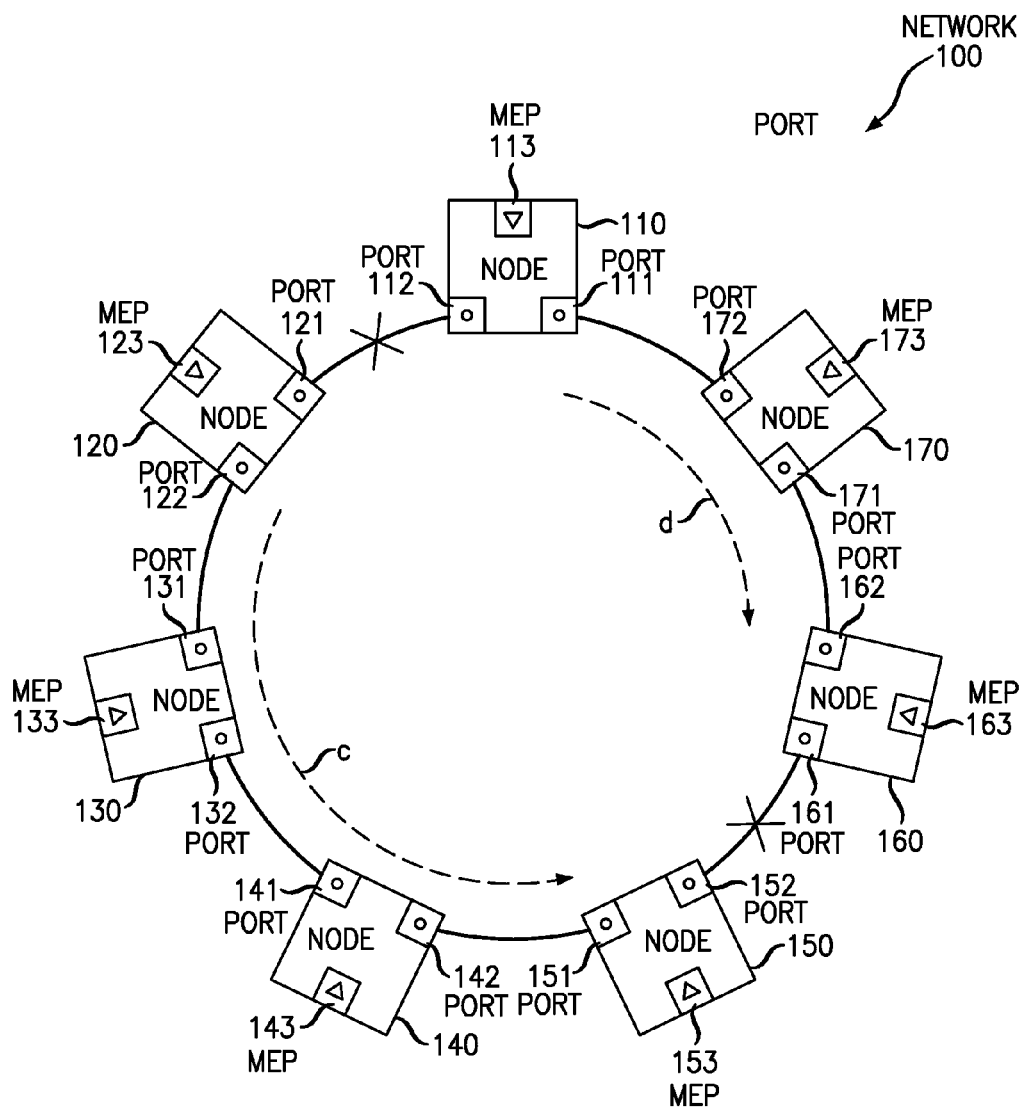
FIG. 5 is a block diagram illustrating the detection of multiple faults according to an embodiment of the present invention.

If more than one fault occurs, the response of the network is similar but not identical to that described above. FIG. 5 is a block diagram illustrating the detection of multiple faults in network 100 according to an embodiment of the present invention. Note that the illustration is generally based on starting with the operating configuration of FIG. 4, where nodes 110 and 120 are the CC message forwarding nodes. As can be seen in FIG. 5, one fault has occurred in the segment of network 100 between port 121 of node 120 and port 112 of node 110, and a second fault has occurred on the network segment between port 152 of node 150 and port 161 of node 160.

As a result of these multiple (here, two) faults, the CC message path c now extends only to port 151 of node 150. Node 150 will attempt to forward the received CC message on port 152, but it will not be successful. CC message path d will similarly terminate at port 162 of node 160. Node 160 will attempt to forward the received CC message on port 161, but it sill no be successful. Fault notifications will be sent from node 120, which will fail to receive an expected CC message from MEP 113 of node 110, and from node 110, which will fail to receive an expected CC message from MEP 123 of node 120. In response, the network 100 will be reconfigured to begin sending CC messages as shown in FIG. 6.

Figure 6:
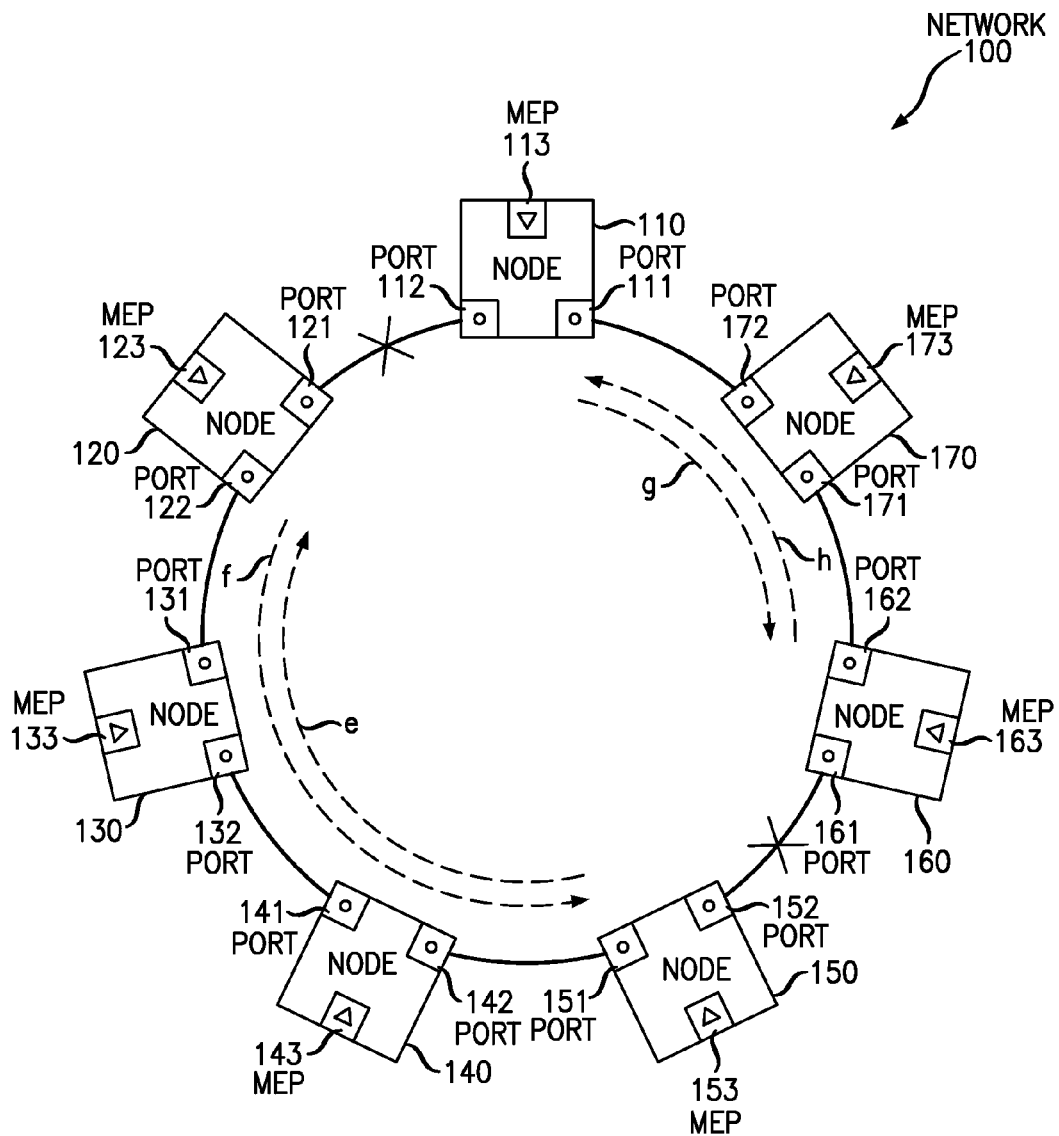
FIG. 6 is a block diagram illustrating a response to detection of the fault illustrated in FIG. 5, according to an embodiment of the present invention.

FIG. 6 is a block diagram illustrating a response to detection of the fault illustrated in FIG. 5, according to an embodiment of the present invention. As can be seen in FIG. 6, four CC message generating nodes have now been selected. MEP 113 of node 110 generates CC messages and sends them on port 111 on path g toward MEP 163 of node 160, which processes them. Intermediate node 170 simply forwards on port 171 the path g CC messages it receives on port 172. In the opposite direction, MEP 163 of node 160 generates CC messages and sends them on port 162 on path h toward MEP 113 of node 110. Intermediate node 170 simply forwards on port 172 the path h CC messages it receives on port 171. In similar fashion, MEP 153 of node 150 generates CC messages for sending to MEP 123 of node 120 along path e, and MEP 123 of node 120 generates CC messages for sending to MEP 153 along path f.

As should be apparent in FIG. 6, there is no path in network 100 such that only two CC message paths passing though all nodes may be formed. In the embodiment of FIG. 6, nodes 110, 120, 150, and 160 each began forwarding CC messages when the network was reconfigured in response to the fault notification, since each of these nodes has a "down" port that cannot successfully send traffic to a neighbor node. As a result, however, in this embodiment, nodes 110, 120, 150, and 160 will continue to send fault notifications until such time as the faults have been somehow corrected. This is because, for example, node 110 expects in normal operation to receive CC messages generated by its neighbor node 120, but instead receives CC messages from node 160, indicating that a fault is present that cannot be remedied through the reconfiguration process. Nodes 120, 150, and 160 will react similarly for analogous reasons. This limited operation may continue indefinitely, presuming no further faults occur, but cannot be fully remedied by the process of the present invention.

Figure 7:
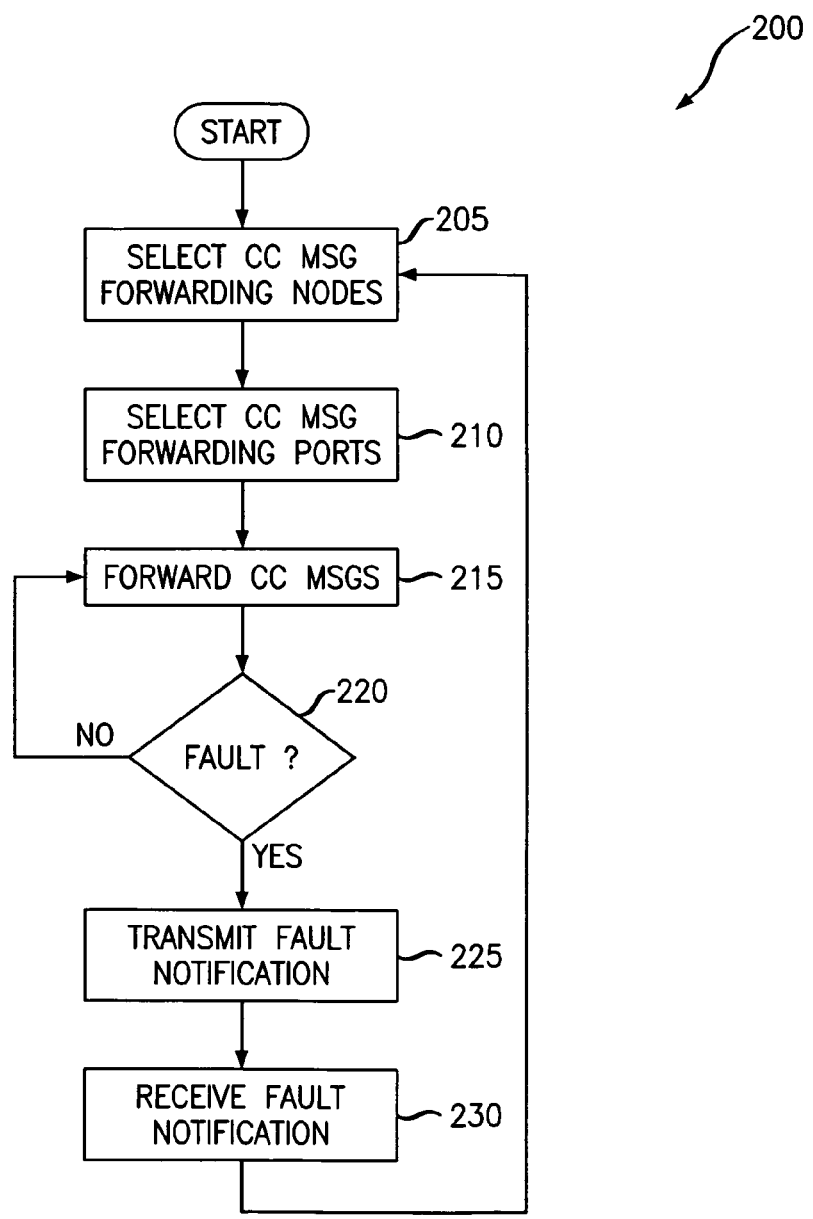
FIG. 7 is a flow diagram illustrating a method of monitoring connectivity in a ring network according to an embodiment of the present invention.

FIG. 7 is a flow diagram illustrating a method 200 of monitoring connectivity in a ring network according to an embodiment of the present invention. At START it is presumed that the network components necessary for performing the method of the present invention are available and operational. Further, it is presumed that the components are configured in a ring topology, either physically or logically, and able to communicate with each other via their neighbor nodes. See, for example, the ring network of FIG. 1. In the embodiment of FIG. 5, the process then begins with selecting two CC message forwarding nodes (step 205). This may be done in any way, including manual configuration by the network operator. In a preferred embodiment, however, the CC message forwarding nodes are selected using an STP (spanning tree protocol) routine. In this embodiment, the selected nodes are those that have been assigned blocked or backup ports by STP. As described above, the network segment between a clocked port and a backup port will not be used for CC message traffic.

Once the CC message forwarding nodes are selected at step 205, their respective CC message forwarding ports are chosen (step 210). This may also be done in a variety of ways, depending on the manner used to select the CC message forwarding nodes. In a preferred embodiment, the forwarding ports are selected as any port on a forwarding node that is not down or has not been designated a blocked or backup port during execution of an STP routine. In an alternate embodiment (not shown in FIG. 7), steps 205 and 210 are performed simultaneously, and may involve populating the respective PDBs of the selected nodes with each others MAC address. Returning to the embodiment of FIG. 7, once the CC message forwarding ports have been selected, CC messages are forwarded (step 215) from the MEPs of the CC message forwarding nodes via the selected forwarding ports.

In this embodiment, the network determines (step 220) if a fault has occurred when at least one of the MEPs associated with a forwarding node fails to receive an expected CC message from the MEP of the other forwarding node. As long as no such failure occurs, the CC message forwarding nodes continue forwarding CC messages (step 215). If a fault is determined to have occurred, then a fault notification is transmitted (step 225). Preferably, each of the nodes in the ring network receives a notification that a fault has occurred (step 230) and the process returns to step 205, where two CC message forwarding notes are chosen. Note that while it would be unusual for the original CC message forwarding nodes to be again selected, there is no requirement that disqualifies either or both of them unless such a requirement is explicitly stated in a particular embodiment.

Figure 8:
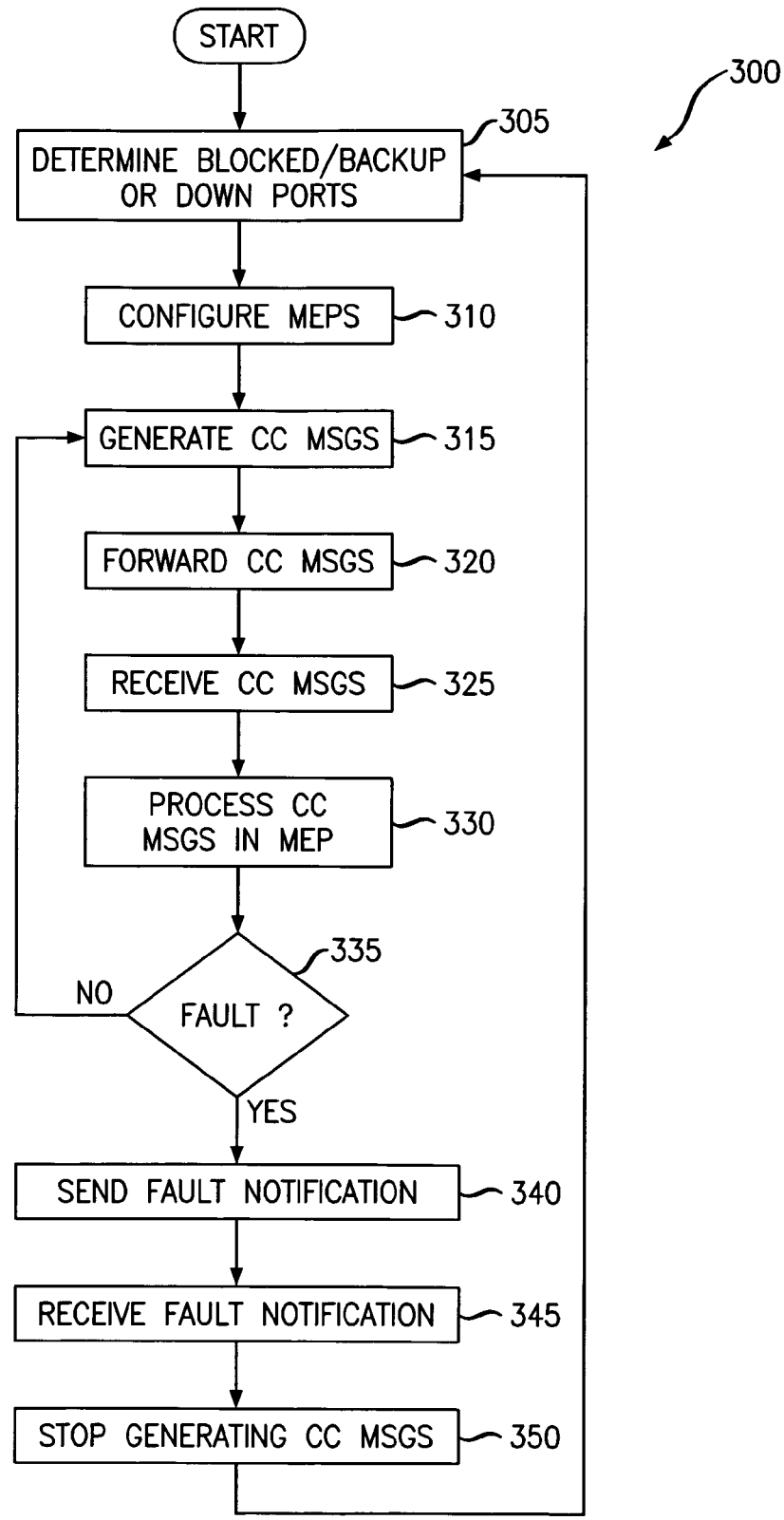
FIG. 8 is a flow diagram illustrating a method of monitoring connectivity in a ring network according to another embodiment of the present invention.

FIG. 8 is a flow diagram illustrating a method 300 of monitoring connectivity in a ring network according to another embodiment of the present invention. At START it is presumed that the network components necessary for performing the method according to this embodiment of the present invention are available and operational. Further, it is assumed that the network components are generally operable according to an Ethernet network protocol, and arranged or configurable in a ring topology. If necessary, the method begins with forming or confirming the existence of this ring topology (step not shown). The process of FIG. 8 begins with determining (step 305) a blocked port and a corresponding backup port, preferably by executing an STP routine.

The blocked and backup port define a segment of the ring network that will not be used for CC message forwarding, unless and until step 305 must be performed again, for example in response to a fault notification. Note that in the event that a network segment is inoperative due to a (planned or unplanned) fault condition, the ports on either side of it are considered "down" ports, and treated as if they were blocked or backup ports when their associated MEPs are configured.

When the blocked and backup ports have been identified, the MEPs of each network node are configured (step 310). The MEPs in nodes having blocked or backup ports are enabled and the remaining MEPs are disabled. The MEPs will be responsible for generating and processing CC messages, while disabled MEPs will ignore CC messages and their respective nodes will simply forward them along their assigned path. Once the MEPs have been configured, the enabled MEPs begin generating CC messages (step 315), which can then be forwarded (step 320) along the ring to the neighbor of the node in which they were generated. As should be apparent, absent a down network segment, each CC message will pass through each node with a disabled MEP, as no CC messages are forwarded on blocked, backup, or down ports.

As mentioned above, each node with a disabled MEP simply forwards (step not shown) a received CC message along the same path on which it was traveling (that is, toward the intended recipient node but not via the port on which it was received). When a CC message is received (step 325) in a node with an enabled MEP, however, the MEP processes or examines the message (step 330). In this way the MEP can determine (step 335) whether a fault is present in the network. This determination may result from the receipt of a CC message that is not from the enabled MEP node's neighbor. This could occur if an intermediate node began generating CC messages in response to one of its ports going down due to a fault condition (not shown, and nodes are not required to behave in this manner unless explicitly stated in a particular embodiment). A fault may also be detected if an expected CC message (from the neighbor node) is not received after a certain time has elapsed. In some implementations, more than one CC message must be missed for a fault to be perceived. In any case, if no fault is detected at step 335, the process continues at step 315 and additional CC messages are generated and sent.

If a fault is detected, according to this embodiment, then fault notification messages are sent (step 340) from the detecting node. When the other nodes receive (step 345) the fault notification, the process returns to step 305 for reconfiguration of the connectivity monitoring scheme. Examples of how this may be accomplished in accordance with the present invention have already been described above, though there may be other recovery scenarios as well.

Note that in some embodiments (not shown), the node that detects a fault will immediately stop generating CC messages until the reconfiguration process is performed (except to the extent that they might be required to accomplish the reconfiguration). When a fault is detected, the configuration of each MEP may be removed until a reconfiguration occurs, or it may be left in its current configuration and only changed if necessary. Finally, with the methods described above in reference to FIGS. 7 and 8, variation within the spirit of the invention is permitted. The steps of each method may be performed in any logically-consistent sequence unless a specific sequence is explicitly required or apparent from the context of a specific embodiment. In some embodiments, additional steps may be inserted into the described method and, in some cases, removed, without departing from the spirit of the invention.

Figure 9:
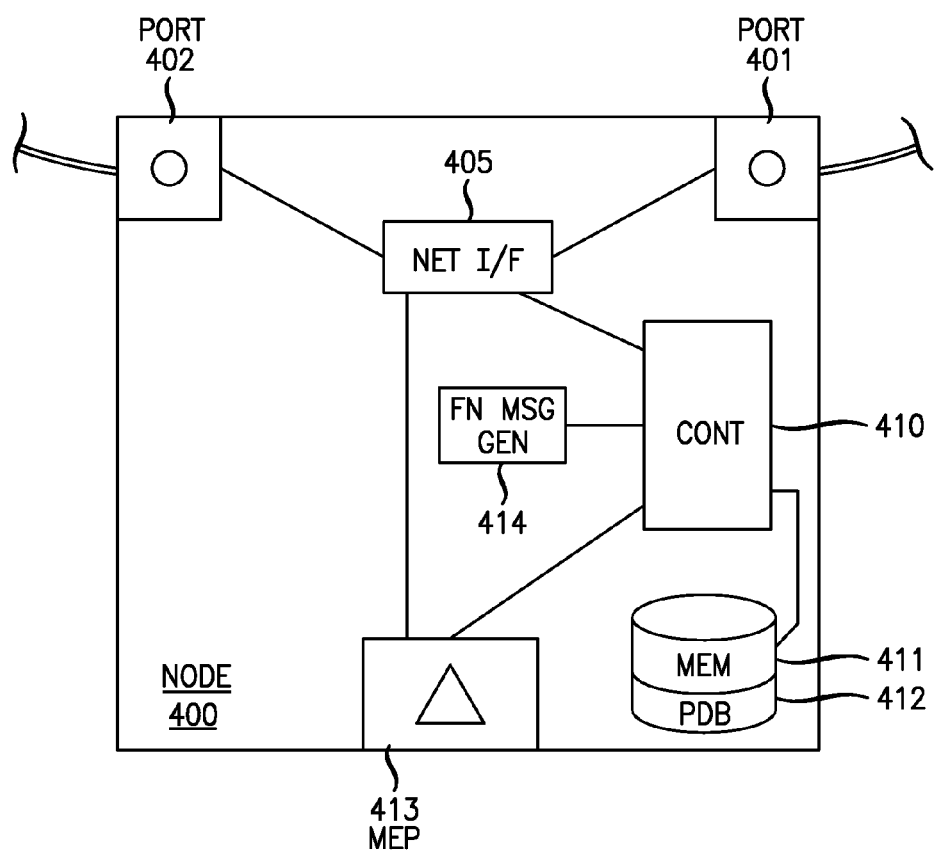
FIG. 9 is a simplified block diagram illustrating selected components of a network node configured to be operable according to an embodiment of the present invention.

FIG. 9 is a simplified block diagram illustrating selected components of a network node 400 configured to be operable according to an embodiment of the present invention. In accordance with the embodiment of FIG. 9, node 400 includes a first port 401 and a second port 402 for sending and receiving messages on the respective neighboring segments of the ring network (not shown in FIG. 9). There may be, of course, be more ports available on the physical device embodying node 400, but for simplicity only those needed for operation according to the present invention are shown. Ports 401 and 402 are connected with a network interface 405 for coordinating the receipt and transmission of network traffic under the direction of controller 410. Network interface 405 determines which ports are down or designated as blocked or backup ports, and facilitates the routing of CC message traffic accordingly.

An MEP 413 is in communication with network interface 405 and also operates under the direction of controller 410. In accordance with the present invention, the MEP is enabled for generating CC messages to be sent via network interface 405, and for processing received CC messages. A memory device 411 including a PDB (permanent database) 412 is in communication with controller 410 and may be used for storing routing tables and information related to the present configuration of MEP 413 and ports 401 and 402, among other things. A fault notification message generator 414 controlled by controller 410 generates fault notification messages for transmission in the event that MEP 413 detects a fault in the network. The components of node 400 are usually but not necessarily resident on a single physical device, and in some cases they may be integrated with each other or separated in to multiple components working in concert to perform the same function as particular component illustrated in FIG. 9.

In the manner described above, the present invention provides for connectivity monitoring and fault recovery in networks having a ring topology, and is of particular advantage when implemented in Ethernet networks. The number of CC messages necessary for connectivity monitoring is greatly reduced when compared to existing methods, and a commensurate conservation of network resources is expected in many if not most applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a network comprising a plurality of nodes configured in a ring topology, a method comprising:

selecting from the plurality of nodes a first pair of neighboring CC (connectivity check) message generating nodes, wherein at least one node of the first pair of nodes comprises a port that is down or designated as a blocked or backup port;

generating CC messages in each of the selected CC message generating nodes and forwarding them to the respective other CC generating node; and determining if a fault in the network has occurred;

wherein at least one node of the plurality comprises an MEP (maintenance end point) and is not in the selected first pair of neighboring CC message generating nodes, and further comprising configuring the non-selected at least one node to not generate CC messages.

2. The method of claim 1, wherein the network is an Ethernet network.

3. The method of claim 2, wherein selecting a first pair of CC message generating nodes comprises executing an STP (spanning tree protocol) routine.

4. The method of claim 3, wherein the CC messages are generated in a respective MEP (maintenance end point) associated with each selected CC message generating node.

5. The method of claim 4, wherein each of the plurality of nodes comprises an MEP, and further comprising configuring each MEP in a non-selected node to not generate CC messages.

6. The method of claim 5, further comprising configuring each MEP in a non-selected node not to process CC messages received in their respective node.

7. The method of claim 1, wherein determining if a fault has occurred comprises failing to receive in a selected node at least one expected CC message generated by its neighbor node.

8. The method of claim 7, wherein failing to receive at least one expected CC message comprises receiving a CC message from a node other than its neighbor node.

9. The method of claim 7, wherein failing to receive at least one expected CC message comprises failing to receive a predetermined number of such CC messages in a predetermined time period.

10. The method of claim 1, further comprising, upon determining that a fault in the network has occurred, transmitting a fault notification.

11. The method of claim 10, wherein the fault notification is transmitted by broadcasting to all other nodes in the plurality of nodes.

12. The method of claim 10, further comprising selecting from the plurality of nodes a second pair of neighboring CC (connectivity check) message generating nodes, wherein at least one node of the second pair of nodes comprises a port that is down or designated as a blocked or backup port.

13. The method of claim 12, further comprising ceasing to generate CC messages in the first pair of selected nodes.

14. A node for use in an Ethernet ring network, comprising:
a first port and a second port for communicating with respective neighbor nodes in the ring network;
a network interface for determining whether either the first port or the second port is a down port or designated as a blocked or backup port;
an MEP (maintenance end point) for generating CC (connectivity check) messages if either the first port or the second port is determined to be a down port or designated as a blocked or backup port, wherein the MEP is arranged to not generate CC messages if the network interface determines that neither the first port nor the second port is a down port or designated as a blocked or backup port;
a controller for controlling at least the network interface and the MEP; and
a memory device in communication with the controller.

15. The node of claim 14, wherein the MEP is further arranged to not process received CC messages if the network interface determines that neither the first port nor the second port is a down port or designated as a blocked or backup port.

16. The node of claim 15, further comprising a fault notification generator for generating a fault notification in the event that the node fails to receive an expected CC message from a neighbor node.

17. The communication system of claim 16, wherein the memory device comprises a PDB (permanent database) for storing the MAC (media access control) address of neighbor nodes.

18. A communication system comprising a plurality of nodes, wherein each node comprises:
a first port and a second port for communicating with respective neighbor nodes in the ring network;
a network interface for determining whether either the first port or the second port is a down port or designated as a blocked or backup port;
an MEP (maintenance end point) for generating CC (connectivity check) messages if either the first port or the second port is determined to be a down port or designated as a blocked or backup port wherein the MEP is arranged to not generate CC messages if the network interface determines that neither the first port nor the second port is a down port or designated as a blocked or backup port;
a controller for controlling at least the network interface and the MEP; and
a memory device in communication with the controller, the memory device comprising a PDB (permanent database) for storing the MAC (media access control) address of neighbor nodes.

19. The communication system of claim 18, wherein the plurality of nodes is logically configured in a ring topology.

* * * * *